(12) United States Patent
Kwon

(10) Patent No.: US 10,634,693 B2
(45) Date of Patent: Apr. 28, 2020

(54) PARTICLE IMAGE VELOCIMETRY AND CONTROL METHOD THEREFOR

(71) Applicant: KOREA AEROSPACE RESEARCH INSTITUTE, Daejeon (KR)

(72) Inventor: Ki Jung Kwon, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 91 days.

(21) Appl. No.: 15/773,506

(22) PCT Filed: Nov. 2, 2016

(86) PCT No.: PCT/KR2016/012528
§ 371 (c)(1),
(2) Date: May 3, 2018

(87) PCT Pub. No.: WO2017/078401
PCT Pub. Date: May 11, 2017

(65) Prior Publication Data
US 2018/0321273 A1 Nov. 8, 2018

(30) Foreign Application Priority Data

Nov. 3, 2015 (KR) .......................... 10-2015-0154124

(51) Int. Cl.
*G06K 9/00* (2006.01)
*G01P 5/20* (2006.01)
(Continued)

(52) U.S. Cl.
CPC .................. *G01P 5/20* (2013.01); *G06T 7/10* (2017.01); *G06T 7/246* (2017.01); *G06T 7/292* (2017.01);
(Continued)

(58) Field of Classification Search
CPC ... G01P 5/20; G06T 2207/10024; G06T 7/10; G06T 7/292; G06T 2207/10016; G06T 7/246; H04N 5/2354
See application file for complete search history.

(56) References Cited

U.S. PATENT DOCUMENTS

| 6,549,274 | B1* | 4/2003 | Arndt ...................... G01P 5/001 356/28 |
| 2002/0145726 | A1* | 10/2002 | Chao ....................... G01P 5/001 356/28 |
| 2010/0039638 | A1* | 2/2010 | Dabiri ..................... G01P 5/001 356/28 |

FOREIGN PATENT DOCUMENTS

| JP | 07-027780 A | 1/1995 |
| JP | 08-122354 A | 5/1996 |

(Continued)

OTHER PUBLICATIONS

International Search Report for PCT/KR2016/012528, dated Feb. 6, 2017 and English translarion, 5 pages.

*Primary Examiner* — Tom Y Lu

(57) ABSTRACT

Provided are a particle image velocimetry and a method of controlling the particle image velocimetry. The particle image velocimetry includes a light source unit including two or more light sources that generate lights of different colors, wherein each of the light sources irradiates tracking particles in a flow field with a predetermined time difference; a camera that captures an image of the tracking particles; a controller that calculates migration distances of the tracking particles by splitting an image of the tracking particles captured by using the camera, into an image of each color, and calculates a velocity of the flow field by using the time difference at which the light of each of the light sources is irradiated and the migration distances of the tracking particles; and a display unit that receives velocity information
(Continued)

of the flow field from the controller to display the velocity information.

16 Claims, 6 Drawing Sheets

(51) Int. Cl.
*G06T 7/246* (2017.01)
*G06T 7/292* (2017.01)
*G06T 7/10* (2017.01)
*H04N 5/235* (2006.01)

(52) U.S. Cl.
CPC . *H04N 5/2354* (2013.01); *G06T 2207/10016* (2013.01); *G06T 2207/10024* (2013.01)

(56) References Cited

FOREIGN PATENT DOCUMENTS

| | | | |
|---|---|---|---|
| JP | 2000-283993 | A | 10/2000 |
| JP | 2008-026033 | A | 2/2008 |
| KR | 10-0576297 | B1 | 5/2006 |

\* cited by examiner

PARTICLE IMAGE VELOCIMETRY AND CONTROL METHOD THEREFOR

TECHNICAL FIELD

The present disclosure relates to a particle image velocimetry and a method of controlling the particle image velocimetry, wherein fine tracking particles are introduced into a flow field and a path of the particles is visualized by using a camera and an illumination light source, and a visualized image is interpreted to measure a velocity of the flow field.

BACKGROUND ART

An air data system used in airplanes consists of a pitot static tube or a pressure port in the surface of a fuselage, a pressure sensor measuring a pressure therefrom, and a processor calculating air data from pressure data. In Korea, development of air data probes has been made in accordance with the progress of Korean-model helicopter projects and unmanned aerial vehicle development projects. These pressure measurement-type air data systems have problems such as icing problems in high altitude and low temperature conditions or a decline in the stealth function (increase of radar cross section (RCS)) due to surface protrusion in the case of fighter planes.

Thus, probes are being developed by using an optical method, and optical air data systems (OADS) that are currently under development use a method of using laser Doppler in most cases. In 2003, NATO's Research and Technology Organization (RTO) conducted research into OADS. In 2011, the Netherlands Aerospace Center (NLR) installed an OADS based on Light Detection and Ranging (LiDAR) developed by Thales in the Daniel's project, at an emergency exit of Cessna Citation II and conducted two test flights. NASA has developed a Lidar through Ophir in Colorado as part of its Small Business Innovation Research (SBIR) program. The European Aeronautic Defence and Space Company (EADS) conducted a test flight in 2014 by using a Lidar developed by Optical Air Data Systems, LLC (OADS). Ophir and Japan's JAXA have also completed registration of U.S. patents of LiDAR-based atmospheric data systems in 2005 and 2013, respectively. In addition, Honeywell and Michigan Aerospace have developed their own OADS based on the laser Doppler principle.

A particle image velocimetry (PIV) is a non-contacting velocity measurement apparatus, and has become a state-of-the-art measurement technique to measure a velocity field in the field of fluid measurement in place of a laser Doppler velocimetry (LDV). While it is complicated to install a LDV and the LDV has a disadvantage of point measurement, PIVs have been rapidly spread as they detect a spatial structure of a flow at one time by using a field measurement method and are capable of acquiring accurate velocity information over the entire flow field without disrupting the flow field, and also due to the development of the camera.

Similar to LiDARs, the PIV uses a laser, but uses pulsed light instead of continuous laser light. In addition, since position information of particles is used instead of the Doppler frequency shift of light scattered from particles, the PIV is less restricted by light sources. Also, movement of particles is analyzed by an image processing technique by photographing several particles, and thus, velocity measurement may be performed at a uniform time interval.

FIG. 1 illustrates an example of a particle image velocimetry (PIV) according to the related art.

As illustrated in FIG. 1, the particle image velocimetry according to the related art includes a camera installed in a direction perpendicular to laser light formed as a sheet, and measures two sheets of particles (measurement volume) that pass the laser light sheet within several microseconds, and performs image processing on the sheets to measure a velocity of a flow field.

However, the particle image velocimetry according to the related art requires a special camera and laser, and thus equipment therefor is expensive and difficult to set up. Thus there are many restrictions in using the particle image velocimetry according to the related art. Moreover, the particle image velocimetry according to the related art is used only for setup and it is difficult to use the same as a portable device.

DESCRIPTION OF EMBODIMENTS

Technical Problem

Provided is a particle image velocimetry whereby various problems caused by limitations and drawbacks according to the related art may be substantially solved.

In more detail, a particle image velocimetry that is manufactured at low costs and has a compact size is provided.

Solution to Problem

According to an aspect of the present disclosure, a particle image velocimetry for measuring a velocity of a flow field, includes: a light source unit including two or more light sources that generate lights of different colors, wherein each of the light sources irradiates tracking particles in a flow field with a predetermined time difference; a camera that captures an image of the tracking particles; a controller that calculates migration distances of the tracking particles by splitting an image of the tracking particles captured by using the camera, into an image of each color, and calculates a velocity of the flow field by using the time difference at which the light of each of the light sources is irradiated and the migration distances of the tracking particles; and a display unit that receives velocity information of the flow field from the controller to display the velocity information.

The particle image velocimetry may further include a synchronizer that outputs a shutter opening signal of the camera and a driving signal of each of the light sources such that two or more light sources irradiate light with a time difference within a frame of the camera.

The light sources may be one of a laser diode and a light-emitting diode.

The light sources may include a plurality of red (R), green (G), and blue (B) laser diodes, wherein the plurality of R, G, and B laser diodes are spaced apart from each other by a predetermined distance with respect to the camera and arranged in an order of R, G, B, R, . . . , G, and B.

The light sources may include red (R), green (G), and blue (B) laser diodes and two cameras, wherein the R, G, and B laser diodes are arranged in a single file, and wherein each camera is arranged on each of two sides, left and right, by a predetermined distance with respect to the R, G, and B laser diodes.

The R, G, and B laser diodes may be arranged at an angle at which an intensity of Mie-scattered light is the greatest.

A relative angle between the R, G, and B laser diodes and the camera may be about 15° or about 25°.

The camera may capture several to several hundreds of frames per second, and may be an industrial-purpose color camera having a global shutter function.

According to another aspect of the present disclosure, a method of controlling the particle image velocimetry is provided, wherein the controller drives the laser diodes of the laser source unit and the camera, and the method includes outputting a camera shutter opening signal and R, G, and B laser driving signals such that the R, G, and B laser diodes respectively irradiate laser light with a predetermined time difference within a same frame of the camera.

Advantageous Effects of Disclosure

According to the particle image velocimetry of the present disclosure, the particle image velocimetry is implemented by using a low-price color camera that is widely used for industrial purpose and laser diodes of three colors, and thus, the particle image velocimetry may be manufactured at low costs and have a single-body structure and thus may be easy to use as a device setup process is not necessary.

Moreover, the particle image velocimetry has a compact size and is easy to carry to desired locations.

BRIEF DESCRIPTION OF DRAWINGS

FIG. 6 illustrates a structure of a particle image velocimetry according to a first embodiment of the present disclosure, wherein FIG. 6(a) is a front view, FIG. 6(b) is a side view, and FIG. 6(c) is a rear view.

FIG. 7 illustrates a structure of a particle image velocimetry according to a second embodiment of the present disclosure, wherein FIG. 7(a) is a front view, FIG. 7(b) is a side view, and FIG. 7(c) is a rear view.

BEST MODE

Embodiments of the present disclosure will now be described below with reference to the accompanying drawings.

In the description of the present disclosure, the detailed description of related known functions or features which might unnecessarily obscure the subject matter of the present disclosure will be omitted. The terms used in this specification are those terms in consideration of functions in regard to the present disclosure, and may vary according to the intention of those of ordinary skill in the art or precedents or the like. Thus, the terms should be understood based on the overall description of the present disclosure.

Figure 2:
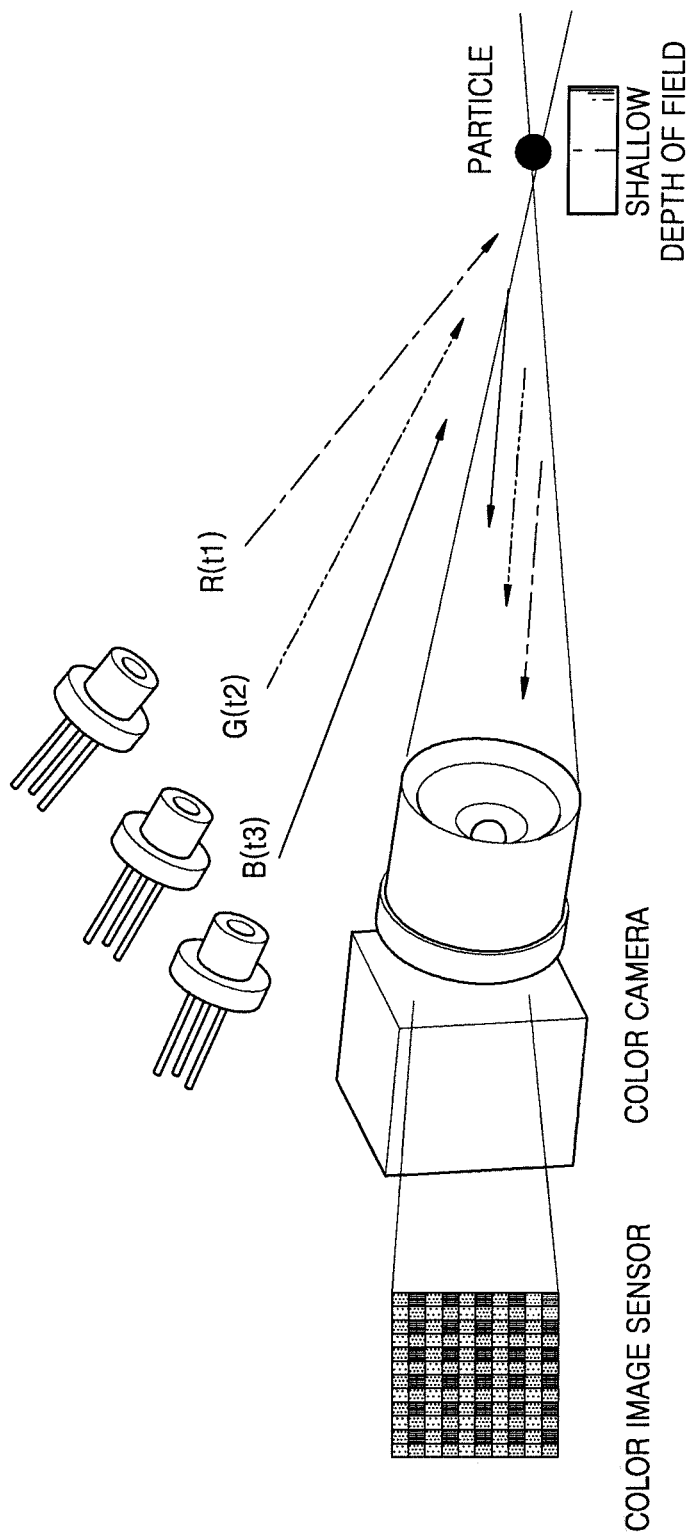
FIG. 2 is a view for describing an operating principle of the particle image velocimetry according to the present disclosure.

FIG. 2 is a view for describing an operating principle of a particle image velocimetry (PIV) according to the present disclosure.

Referring to FIG. 2, according to the present disclosure, a technique of measuring a velocity of a flow field is provided, wherein a low-price color camera (global shutter-applied camera) which is frequently used for industrial purpose and light sources of three colors, R, G, and B, are used to irradiate light from each of the light sources with a time difference, and one image is split into particle images of each of R, G, and B pixels, and then an image processing method (cross correction; R-G, G-B, and R-B) is applied to the particle images to calculate velocities of three fluids and average the velocities to measure a velocity of a flow field.

Alternatively, instead of the light sources of the three colors, R, G, and B, only two of the light sources may be used to measure a velocity of a flow field. In this case, light may be irradiated from each light source with a time difference and an image may be split into two particle images, and then an image processing method (cross correction; R-G, G-B, and R-B) may be applied to calculate velocities of three fluids to measure a velocity of a flow field.

Figure 3:
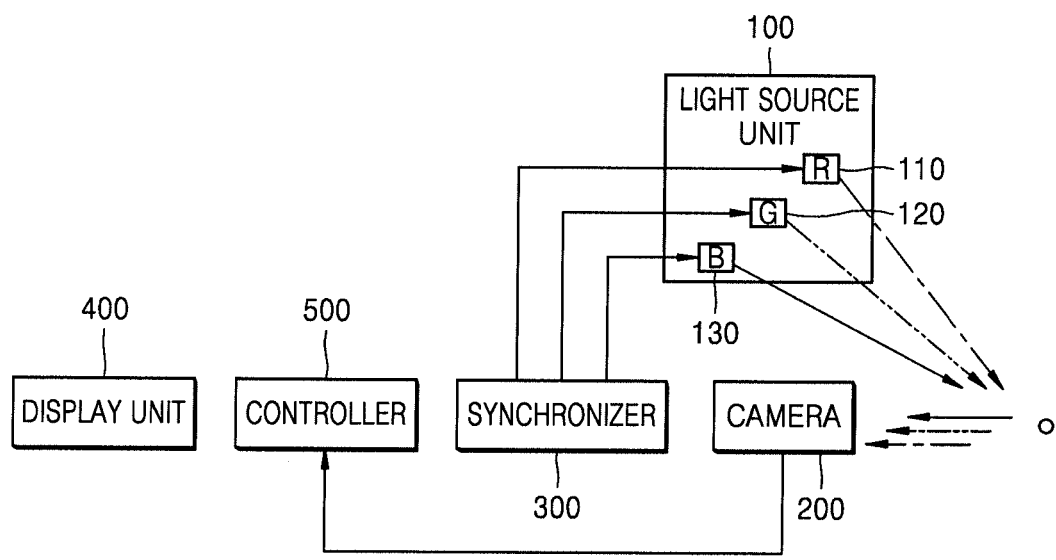
FIG. 3 is a structural block diagram illustrating a particle image velocimetry according to an embodiment of the present disclosure.

FIG. 3 is a structural block diagram illustrating a particle image velocimetry according to an embodiment of the present disclosure.

Referring to FIG. 3, the particle image velocimetry according to an embodiment of the present disclosure includes a light source unit 100, a camera unit 200, a synchronizer 300, a display unit 400, and a controller 500.

The light source unit 100 includes laser diodes (LDs) or light-emitting diodes (LEDs) of three colors, red (R), green (G), and blue (B), and laser light of red (R), green (G), and blue (B) colors is emitted from the light source unit 100 at a predetermined time interval within a same frame of a camera.

The light source unit 100 allows to irradiate particles under an increased energy integration degree by using linear laser light of the order of several mW instead of laser light sheet required by a particle image velocimetry according to the related art, and allows to capture an image of a particle even at a low energy intensity with a relatively short distance of several tens of cm between the laser diodes and the camera.

The camera unit 200 captures an image of a particle to which laser light is irradiated. The camera unit 200 may be an industrial-purpose color camera capable of capturing several tens to several hundreds of frames per second.

In addition, in order to capture two consecutive particle images, a camera having a double image double exposure (frame straddling) function is needed. While a time interval between two laser light sources is determined based on wind velocity and an area to be photographed, a subsonic velocity area typically requires a time interval of several to several hundreds of µs, and it is impossible to capture an image of the subsonic velocity area by using a general digital camera. Accordingly, a particle image measurement method performed using a color camera may be used. When a color camera is used, a frame has an exposure period of at least 100 ms, and a particle image to which R, G, and B laser lights are irradiated is captured within this period. That is, according to a typical PIV, an image of a particle is captured according to the shape of the particle due to a short exposure period. However, according to the present disclosure, there is a difference in that an image of a particle is captured as a track according to the present disclosure.

Figure 4:
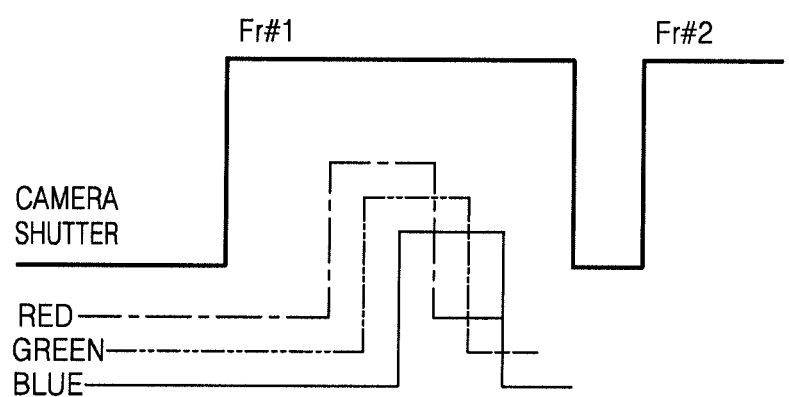
FIG. 4 is a timing diagram illustrating a driving period of a camera and a laser for capturing an image of a particle.

FIG. 4 is a timing diagram illustrating a driving period of a camera and a laser for capturing an image of a particle. Laser lights according to R, G, and B colors are irradiated with time differences within a frame of a camera, and thus, locations of images captured with respect to a same particle are different.

As described above, when using the LDs or LEDs of three colors, red (R), green (G), and blue (B) as light sources, images of particles that are scattered upon receiving R, G, and B lights irradiated within a same frame of a camera at a time interval therebetween are stored in each pixel. That is, one color image may be split into three particle images. The color camera used herein needs to have a global shutter function. A global shutter exposes the entire frame at the same time and then closes at a time, and thus a point of capturing a frame is identical and there is no distortion due to time difference.

When laser light sheet is used and a cross-section perpendicular to the light sheet is captured as according to the PIV of the related art, a focus of a camera is configured such that the entire photographing area is in focus. However, in order to specify a location of a particle scattered by light irradiated to the front around a camera instead of laser light sheet, a depth of focus function of a camera and a lens may be used in an opposite manner. When a large lens aperture (25 mm or more) is set and an aperture is opened to the maximum to set a depth of focus of several to several tens of mm, a location of a particle whose image is to be measured may be adjusted.

The synchronizer 300 controls operation of R, G, and B laser diodes 110, 120, and 130 of the light source unit 100 and the camera unit 200 with nanosecond precision. In detail, the synchronizer 300 transmits a shutter opening signal of the camera, and transmits a signal such that the R, G, and B laser diodes 110, 120, and 130 respectively irradiate laser light with a predetermined time difference within a same frame of the camera.

The controller 500 controls an overall operation of the particle image velocimetry, and particularly controls such that a signal is transmitted to obtain an image, to the synchronizer 300 to drive the light source unit 100 and the camera unit 200 and that a particle image is received from the camera unit 200 to split the same into R, G, and B images, and cross correlation is applied to each image to calculate migration distances of particles, and then a velocity component is calculated based on a time interval between laser lights and the migration distances of the particle and the display unit 400 outputs the calculated velocity component.

Even when an image of a particle is not captured as a completely spherical shape in a particle image, as a PIV image processing method includes processing two images by cross correlation, an average positional dislocation of particles may be obtained through calculation. A particle image processing for cross correlation may be performed on three pairs of images, R-G, G-B, and R-B colors, and a velocity vector extracted from the three pairs of images may be used as an average.

An operation of the particle image velocimetry according to an embodiment of the present disclosure having the above-described structure will be described below.

Figure 5:
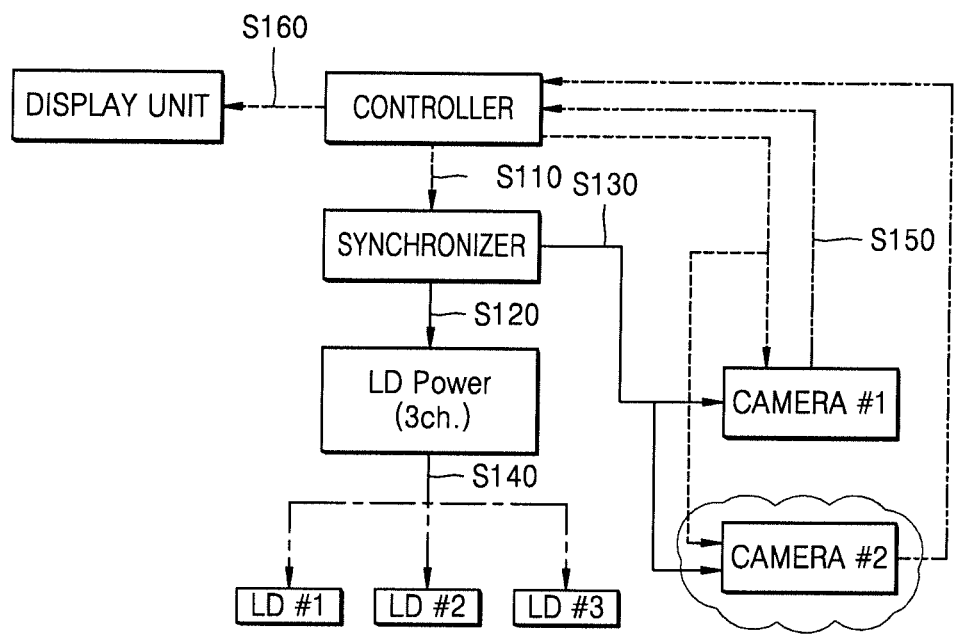
FIG. 5 illustrates a signal flow of a particle image velocimetry according to an embodiment of the present disclosure.

FIG. 5 illustrates a signal flow according to an operation of a particle image velocimetry according to an embodiment of the present disclosure.

Referring to FIG. 5, first, when the controller transmits a signal for obtaining an image to the synchronizer through serial communication such as USB, RS232 or the like (S110), a synchronization signal (trigger signal) of the synchronizer is turned on (S120), thereby driving the laser diodes of the light source unit and the camera (S130, S140). Here, the controller transmits a camera shutter opening signal (S130) and R, G, and B laser driving signals (S140) such that the R, G, and B laser diodes respectively irradiate laser light with a predetermined time difference within a same frame of the camera.

According to the PIV of the related art, laser light is irradiated only for a very short period of about seven to eight ns, and thus, a particle image is captured instantaneously. However, according to the present embodiment, a low-intensity laser diode is used to reduce a volume and a weight of the particle image velocimetry, but an irradiation period of laser light is set to be relatively long of the order of about several tens of µs, so as to conduct measurement such that movement tracks of particles are shown. As there is a time difference in irradiation of laser light according to respective colors, locations where images are captured with respect to a same particle differ from each other.

Next, the controller receives a particle image from the camera (camera #1, camera #2) to split the particle image into R, G, and B images, and applies a cross correlation method (R-G, G-B, and R-B) to each image to calculate a migration distance of particles, calculates a velocity component based on a time interval between laser lights and a migration distance of the particles, and then controls the display unit to output the calculated velocity component (S160).

As described above, according to the present embodiment, a velocity of a flow field may be measured by using a low-price color camera having a global shutter and laser diodes of three colors, R, G, and B to irradiate light from each laser diode with a time difference and by splitting an image into particle images of R, G, and B pixels, and then applying cross correlation to calculate velocities of three fluids and average the same. Accordingly, a portable particle image velocimetry may be implemented at low costs.

Meanwhile, the particle image velocimetry according to the present disclosure may be integrated to a single body (housing).

Figure 6:
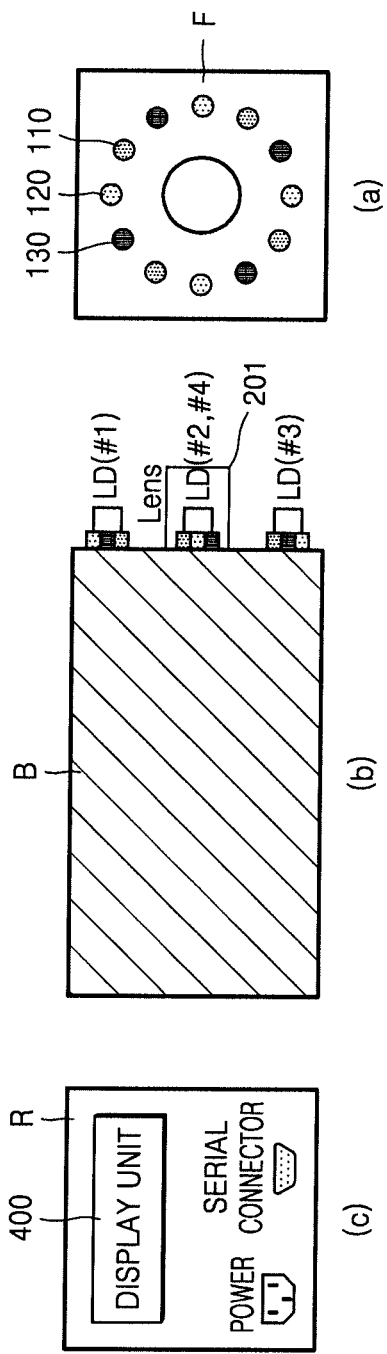

FIG. 6 illustrates a structure of a particle image velocimetry according to a first embodiment of the present disclosure, wherein FIG. 6(*a*) is a front view, FIG. 6(*b*) is a side view, and FIG. 6(*c*) is a rear view.

Referring to FIG. 6, the particle image velocimetry includes a rectangular parallelepiped housing overall, and a camera lens 201 is located in a center portion of a front surface (F) of the housing, and a plurality of R, G, and B laser diodes 110, 120, and 130 may be arranged around the camera lens 201.

The R, G, and B laser diodes 110, 120, and 130 arranged around the camera lens 201 are spaced apart from each other by a predetermined distance with respect to the camera lens 201 and arranged in an order of R, G, B, R, . . . , G, B.

In addition, the R, G, and B laser diodes 110, 120, and 130 are arranged at a preset particular angle, for example, at a fixed angle of about 15° or about 25° such that all laser lights are concentrated at one point. Aerosol particles in the art have an average diameter of about 1.0 µm, and thus irradiated laser light undergoes Mie scattering. Intensity of Mie-scattered light differs according to particle diameters, but when a proceeding direction of laser light is set at 180°, an intensity of light scattered in a reverse direction has a high value in directions at about 15° and about 25°. Accordingly, a relative angle between the R, G, and B laser diodes 110, 120, and 130 and the camera needs to be set at an angle (15° and 25°) that allows photographing of particles due to a relatively high intensity of the scattered light.

In addition, according to the present embodiment, instead of laser light sheet required by the PIV according to the related art, linear laser light of the order of about several mW is used to irradiate a particle with a higher energy integration degree, and particles may be photographed with a low energy intensity by setting a short distance of several tens of cm between a laser and a camera. For reference, a laser for a PIV used in labs frequently use Nd:YAG pulse laser from which light is emitted for about seven to about eight ms, and continuous light laser of about several Watts is frequently used for a LDV. For both cases, a water cooling type is frequently used to dissipate heat generated in laser heads, and this has become the reason for the increased volume and weight of the laser heads.

In addition, a diameter of laser light is configured to be slightly greater than a size of an interrogation section for PIV image processing in a particle image (for example, 32×32 pixels). By setting a measurement point and making a depth of focus section of the camera to correspond to this point, photographing of images of an area outside this point is prevented.

Referring back to FIG. 6, the display unit 400 is located on a rear surface R of the housing of the particle image velocimetry, and circuits such as the controller, the synchronizer or the like may be included in the body B of the housing.

According to the first embodiment described above, two velocity components are measured by using one camera. However, when two cameras are used, three velocity components may be measured by using a stereo method.

MODE OF DISCLOSURE

Figure 7:
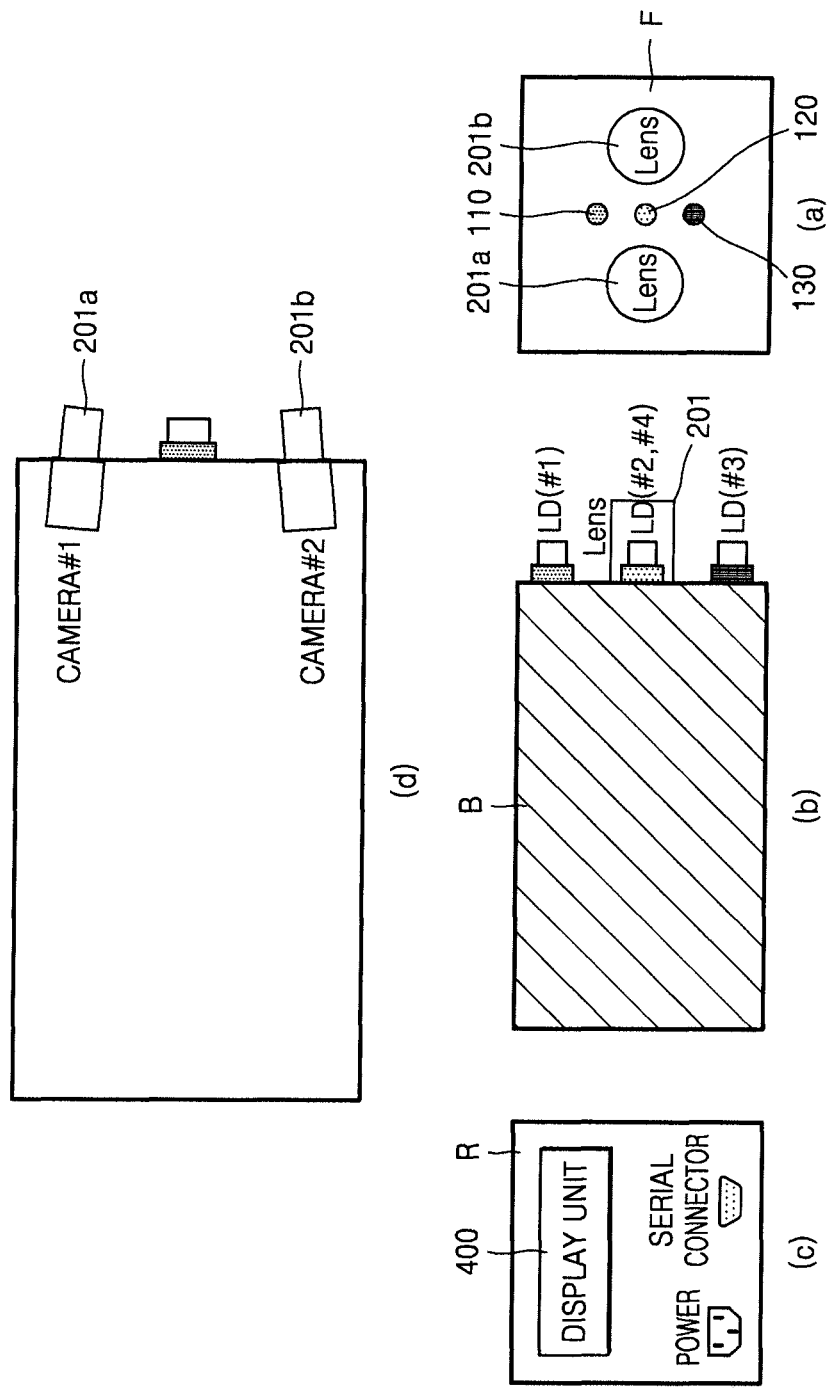

FIG. 7 illustrates a structure of a particle image velocimetry according to a second embodiment of the present disclosure, wherein FIG. 7(a) is a front view, FIG. 7(b) is a side view, and FIG. 7(c) is a rear view.

Figure 1:
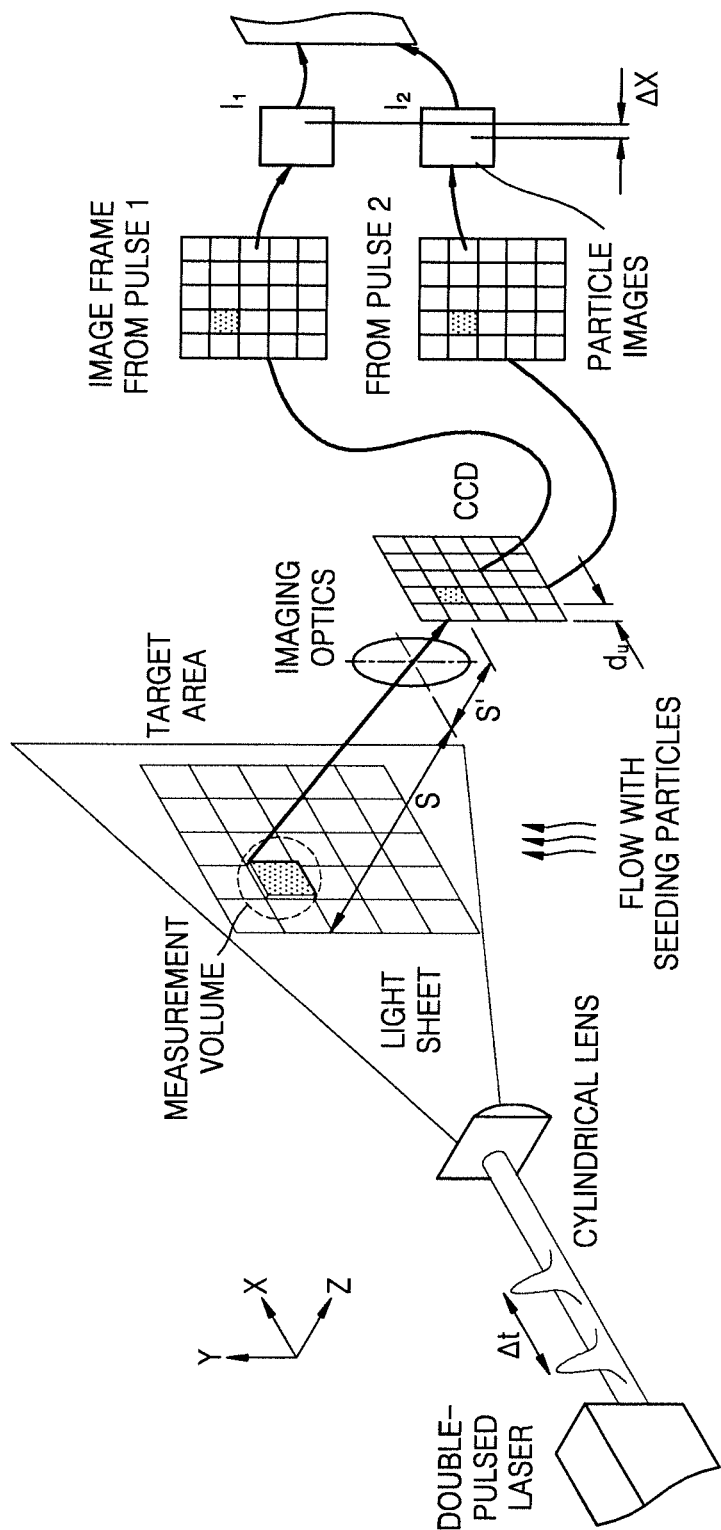
FIG. 1 illustrates an example of a particle image velocimetry according to the related art.

Referring to FIG. 7, the present embodiment is just different from the first embodiment of FIG. 1 described above in that two cameras 201a and 201b and a set of R, G, and B laser diodes 110, 120, and 130 are included in a front surface F of the particle image velocimetry, and a structure of a rear surface and a body of the particle image velocimetry according to the present embodiment are the same as those of the first embodiment of FIG. 6. Thus, the structure of the front surface F will be described here only.

According to the present embodiment, a set of R, G, and B laser diodes 110, 120, and 130 are arranged at equidistant intervals in a single file, and a camera is arranged on each of two sides, left and right, with respect to the R, G, and B laser diodes 110, 120, and 130. Likewise, the R, G, and B laser diodes 110, 120, and 130 may be arranged at a preset particular fixed angle (for example, 15° or 25°).

By using two cameras (cameras #1, camera #2) as above, three velocity components may be measured using a stereo method.

Meanwhile, while the particle image velocimetry having a rectangular parallelepiped housing is disclosed according to the first and second embodiments described above, the shape of the housing is not limited thereto, and the housing may have other various three-dimensional shapes.

While laser diodes are used as the light sources in the above-described embodiments, light-emitting diodes (LED) may also be used, as is obvious.

While the embodiments have been particularly described with reference to the detailed description and the attached drawings, it will be understood by those of ordinary skill in the art that various substitutions, modifications, and changes may be made therein without departing from the spirit and scope of the present disclosure. For example, a size or location of a display emitting device may be varied.

Therefore, the scope of the present disclosure is defined not by the embodiments, but by the appended claims and any equivalent ranges thereto.

INDUSTRIAL APPLICABILITY

According to the particle image velocimetry and the method of controlling the particle image velocimetry of the present disclosure, fine tracking particles may be introduced into a flow field and a path of the particles may be visualized by using a camera and an illumination light source, and a velocity of the flow field may be measured by interpreting a visualized image.

The invention claimed is:

1. A particle image velocimetry for measuring a velocity of a flow field, the particle image velocimetry comprising:
a light source unit comprising a first light source configured to emit first laser light of a first color toward a first point in the flow field, a second light source configured to emit second laser light of a second color toward the first point, and a third light source configured to emit third laser light of a third color toward the first point;
a camera configured to set such that the first point is included in a focal depth range and to capture a color image of tracking particles migrating at the first point;
a synchronizer configured to output a shutter opening signal to the camera and sequentially output first, second, and third laser driving signals to the first, second, and third light sources, such that the first, second, and third light sources irradiate the first, second, and third laser light to the tracking particles migrating at the first point with a preset time difference within a frame of the camera; and
a controller configured to calculate migration distances of the tracking particles by splitting the color image of the tracking particles captured by using the camera, into a first image of the first color, a second image of the second color, and a third image of the third color and aligning each of the first and second images and the second and third images by using cross-correlation, and calculate a velocity of the flow field based on the preset time difference and the migration distances of the tracking particles,
wherein a first time section in which the first light source emits the first laser light, a second time section in which the second light source emits the second laser light, and a third time section in which the third light source emits the third laser light all have substantially the same time length,
wherein the first, second, and third time sections are included in one frame of the camera, and
wherein the first time section and the second time section are partially overlapped with each other, and the second time section and the third time section are partially overlapped with each other.

2. The particle image velocimetry of claim 1, further comprising a display configured to receive information about the velocity of the flow field calculated by the controller and display the velocity of the flow field.

3. The particle image velocimetry of claim 1, wherein each of the first, second, and third light sources comprises a laser diode, and the first, second, and third laser light are all overlapped with one another at the first point.

4. The particle image velocimetry of claim 1, wherein each of the first, second, and third light sources comprises a plurality of light sources, and wherein the plurality of first light sources, the plurality of second light sources, and the plurality of third light sources are spaced part from each other by a first radius around the camera and equally arranged in an order of the first light source, the second light source, and the third light source.

5. The particle image velocimetry of claim 1, wherein the camera is an industrial-purpose color camera having a global shutter function.

6. The particle image velocimetry of claim 1, wherein the camera is a first camera that captures a first color image of the tracking particles,
the particle image velocimetry further comprising a second camera configured to set such that the first point is included in a focal depth range and to capture a second color image of the tracking particles,
wherein the controller is further configured to receive the first and second color images to generate a stereo image and calculate a 3-axis velocity component of the flow field from the stereo image.

7. The particle image velocimetry of claim 1, wherein the synchronizer is further configured to output the first laser driving signal during the first time section after outputting the shutter opening signal, output the second laser driving signal during the second time section at a time point when the outputting of the first laser driving signal starts and a first time corresponding to the preset time difference passes, output the third laser driving signal during the third time section at a time point when the outputting of the second laser driving signal starts and the first time corresponding passes, and end the one frame of the camera that is started by the shutter opening signal after the outputting of the third laser driving signal starts and a time corresponding to the third time section passes.

8. The particle image velocimetry of claim 1, wherein the camera and the first, the second, and the third light sources are arranged at an angle between about 15° to about 25° around the first point such that the camera receives to the greatest the first, the second, and the third laser light that are Mie-scattered in the tracking particles.

9. A particle image velocimetry for measuring a velocity of a flow field, the particle image velocimetry comprising:
a light source unit comprising a first light source configured to emit first laser light of a first color toward a first point in the flow field, a second light source configured to emit second laser light of a second color toward the first point, and a third light source configured to emit third laser light of a third color toward the first point;
a first camera configured to set such that the first point is included in a focal depth range and to capture a first color image of tracking particles migrating at the first point;
a second camera configured to set such that the first point is included in the focal depth range and to capture a second color image of the tracking particles;
a synchronizer configured to output a shutter opening signal to the camera and sequentially output first, second, and third laser driving signals to the first, the second, and the third light sources, such that the first, the second, and the third light sources irradiate the first laser light, the second laser light, and the third laser light to the tracking particles migrating at the first point with a preset time difference within a frame of the camera; and
a controller configured to generate a stereo image from the first color image end the second color image and calculate 3-axis components of the velocity of the flow field from the stereo image.

10. The particle image velocimetry of claim 9, further comprising a display configured to receive information about the 3-axis components of the velocity of the flow field calculated by the controller and display the 3-axis components of the velocity of the flow field.

11. The particle image velocimetry of claim 9, wherein each of the first, the second, and the third light sources comprises a laser diode, and the first, the second, and the third laser lights are all overlapped with one another at the first point.

12. The particle image velocimetry of claim 9, wherein the first, the second, and the third light sources are arranged linearly, and
wherein the first camera and the second camera are arranged spaced apart from each other by the same distance at both sides of the first, the second, and the third light sources.

13. The particle image velocimetry of claim 9, wherein the first and the second cameras and the first, the second, and the third light sources are arranged at an angle between about 15° to about 25° around the first point such that each of the first and the second cameras receives to the greatest the first, the second, and the third laser lights that are Mie-scattered in the tracking particles.

14. The particle image velocimetry of claim 9, wherein the camera is an industrial-purpose color camera having a global shutter function.

15. A method of controlling a particle image velocimetry for measuring a velocity of a flow field, the particle image velocimetry comprising:
a light source unit comprising a first light source configured to emit first laser light of a first color toward a first point in the flow field, a second light source configured to emit second laser light of a second color toward the first point, and a third light source configured to emit third laser light of a third color toward the first point; and
a camera configured to set such that the first point is included in a focal depth range,
the method performed by at least one processor of the particle image velocimetry comprising:
outputting a shutter opening signal to the camera such that the camera captures a color image of tracking particles migrating at the first point;
sequentially outputting first, second, and third laser driving signals to the first, the second, and the third light sources, such that the first, the second, and the third light sources irradiate the first, the second, and the third laser lights to the tracking particles migrating at the first point with a preset time difference within a frame of the camera; and
splitting the color image of the tracking particles captured by using the camera into a first image of the first color, a second image of the second color, and a third image of the third color;
calculating migration distances of the tracking particles by aligning each of the first and second images and the second and third images by using cross-correlation; and
calculating a velocity of the flow field based on the preset time difference and the migration distances of the tracking particles,
wherein a first time section in which the first light source emits the first laser light, a second time section in which the second light source emits the second laser light, and a third time section in which the third light source emits the third laser light all have substantially the same time length, wherein the first, the second, and the third time sections are included in one frame of the camera, and wherein the first time section and the second time section are partially overlapped with each other, and the second time section and the third time section are partially overlapped with each other.

16. The method of claim 15, wherein the sequentially outputting of the first, the second, and the third laser driving signals to the first, the second, and the third light sources comprises:

outputting the first laser driving signal during the first time section after outputting the shutter opening signal;

outputting the second laser driving signal during the second time section at a time point when the outputting of the first laser driving signal starts and a first time corresponding to the preset time difference passes;

outputting the third laser driving signal during the third time section at a time point when the outputting of the second laser driving signal starts and the first time corresponding passes; and ending the one frame of the camera that is started by the shutter opening signal after the outputting of the third laser driving signal starts and a time corresponding to the third time section passes.

\* \* \* \* \*